UNITED STATES PATENT OFFICE.

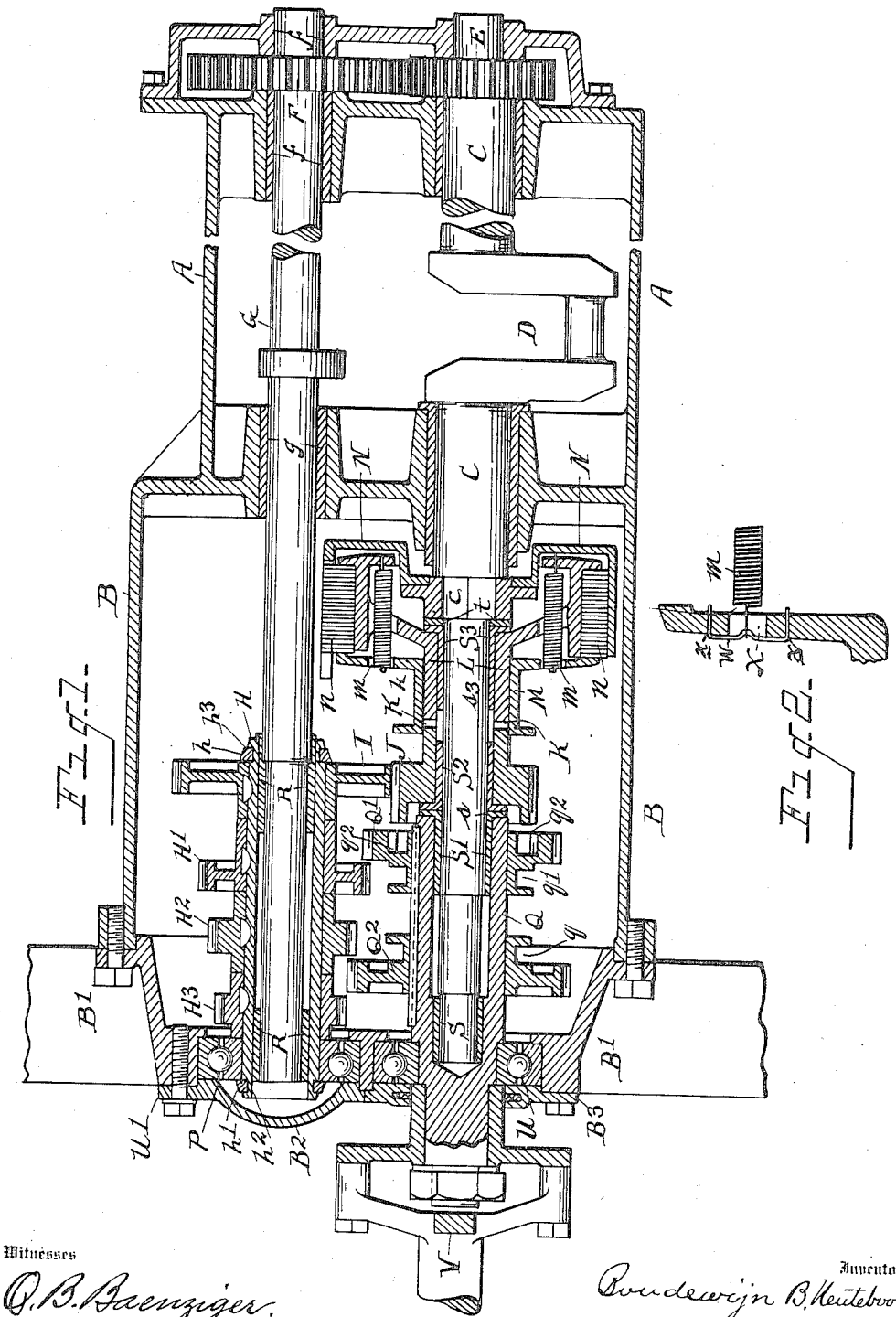

BOUDEWIJN B. NEUTEBOOM, OF DETROIT, MICHIGAN.

CHANGE-SPEED GEARING.

1,168,899. Specification of Letters Patent. Patented Jan. 18, 1916.

Application filed April 29, 1911. Serial No. 624,072.

*To all whom it may concern:*

Be it known that I, BOUDEWIJN B. NEUTEBOOM, a subject of the Queen of the Netherlands, residing at Detroit, county of Wayne, State of Michigan, have invented a certain new and useful Improvement in Change-Speed Gearing, and declare the following to be a full, clear, and exact description of the same, such as will enable others skilled in the art to which it pertains to make and use the same, reference being had to the accompanying drawings, which form a part of this specification.

My invention relates to change-speed gearing, and an object of my invention is to provide a device for adjusting the relative speeds of the driving and driven shaft in an automobile, which device shall be simple in construction readily put together and taken apart, and shall involve little friction between the parts. I accomplish this object in the device illustrated in the accompanying drawings in which:—

Figure 1, is a horizontal section of a change-speed gearing embodying my invention and adjacent parts. Fig. 2, is a detail view illustrating the manner of attaching the springs $m$ $n$.

A A represent the crank case of a gas engine.

B B indicate the casing for the change-speed gearing. The casing B is represented as forming an extension of the case A, its end remote from the case A being open except for the plate $B^1$ which closes that end of the case and is bolted thereto.

$B^2$ and $B^3$ are plates closing openings in the end plate $B^1$.

C is the main shaft of a gas engine resting in bearings in the crank case A and extending through the casing B. D indicates one of the cranks of said engine on the shaft $a$.

E is a gear wheel upon the shaft C.

G is a counter shaft constituting the camshaft of the engine resting in bearings $f$ $g$ in the crank case A and extending through the casing B parallel to the extension of the main shaft C of the engine.

F is a gear wheel upon the shaft G of twice the diameter of the gear wheel E. The gear wheels E and F intermesh so that the shaft G has half the angular velocity of the shaft C.

H is a sleeve upon bushings R R on the extension of the shaft G.

I is a gear wheel upon the sleeve H.

J is a gear wheel sleeved upon the bushing $S^2$ on an extension of the shaft C.

L is a part of a clutch mechanism sleeved upon a bushing $S^3$ on an extension of the shaft C. The hubs of the gear wheel J and clutch part L are provided with teeth which interlock at the point marked K in the drawing.

$k$ is a sleeve adapted to move longitudinally upon the clutch part L and having a periphery adapted to engage against the friction plates $n$ to engage the clutch parts.

N is the second clutch part which is fitted snugly upon a squared portion $c$ of the shaft C.

$m$ $m$ are tension springs acting to draw the sleeve $k$ against the plates $n$ so as to cause the frictional engagement of said plates. A wire W is looped at its center and turned at right angles at its ends. There are holes $x$ in the web of the sleeve $k$ into which the ends of the springs $m$ extend. There are holes $x$—$x$ of small diameter on each side of and at equal distances from the holes X. The ends of the wire W extend into the small holes and its loop or bend extends into the hole X and is engaged by the hooked end of a spring $m$ as shown in Fig. 2.

A means, not shown, but which will be readily supplied by those conversant with the art, is contemplated, by which the sleeve $k$ may be drawn out of engagement with the plate $n$.

The gear wheels I and J engage each other and the latter is half the diameter of the former.

Q is a sleeve bearing upon bushings S $S^1$ upon an extension of the shaft C and resting in a radial and thrust ball bearing U secured in the head $B^1$ of the gear casing B.

V indicates the transmission shaft which is driven by the sleeve Q.

$Q^1$ $Q^2$ are gear wheels of different sizes keyed so as to be movable longitudinally upon the sleeve Q.

The sleeve H rests at one end in a radial and thrust ball bearing P which is supported in the head $B^1$ of the gear casing B B.

$H^1$, $H^2$, $H^3$ are gear wheels keyed upon the sleeve H.

$h^2$ and $h^3$ are grooves formed around the ends of the sleeve H.

$h$ $h^1$ are rings adapted to engage in the grooves $h^2$ $h^3$.

The ball bearings P and U fit into openings in the cover plate B¹, and are held in said openings and against shoulders in the walls thereof by cover plates B² and B³.

The gear wheels are placed upon the sleeve H and the bearing P is adjusted to position on said sleeve. The rings $h$ $h^1$ are then placed in the grooves $h^2$ $h^3$ thus preventing the removal of said gear wheels or bearing.

The gear wheel H¹ is adapted to be engaged by the gear wheel Q¹ and the gear wheel H² by the gear wheel Q². The gear wheel Q¹ is provided with indentations $q^2$ in one of its faces in which engage projections from the gear wheel J when the wheel Q¹ is moved to the end of its travel at the right as shown in Fig. 1.

Normally the clutch is engaged so that the shaft C and sleeve L move together and the gear wheel J engaging the sleeve L also moves with the shaft C. When the gear wheel Q¹ is moved into position to engage the wheel J the latter is united to the sleeve Q so that said sleeve turns with the shaft C and at the same angular velocity. With this engagement the sleeve L upon the shaft C and the gear wheel J turn with approximately the same velocity as the shaft C and there is no relative angular motion and friction between the shaft and sleeve and the gear wheel J. In this position also the sleeve H turns at approximately the same angular velocity and in the same direction as the shaft G because the gear wheels J and I have the same ratio of diameters as the gear wheels E and F. There is therefore no relative motion, and consequently no friction, between the sleeve H and the shaft G.

When the gear wheel Q¹ is moved to the left its teeth engage the wheel H¹ and one speed of the gearing is secured. With this adjustment the sleeve Q would have a different angular velocity from that of the shaft C as it would also when the gear wheel Q² is moved to the right to engage the gear wheel H². The gear wheel Q² is moved to the left to secure the reverse speed by a means that is not essential to this invention and would be readily supplied by those conversant with the art.

Any force brought against the sleeve H longitudinally thereof, will be taken by the bearing P and any longitudinal force upon the sleeve Q will be taken by the ball and thrust bearing U.

It will be noticed that by this construction the cam shaft G and the main shaft C of the engine are utilized as parts of the change-speed gearing and thus the parts and the cost of construction is lessened.

It will be observed that the sleeve H always turns with approximately the same angular velocity as the shaft G; and that gear wheel J and sleeve L always turn with approximately the same angular velocity as the shaft C when the clutch parts are engaged.

The bushings S¹ S² are turned up to form flanges $s$ which abut against each other and are interposed between the ends of the sleeve Q and the gear wheel J. The bushing S³ is turned upward to form a flange abutting against the end of the sleeve L and there is a washer $t$ which is inserted between the hub of the clutch part N and the sleeve L. By supplying a washer $t$ of the required thickness, a close fit may be secured between all the parts between the sleeve Q and the hub of the clutch portion N.

The plate B² secures the radial and thrust bearing P in place and the plate B³ the radial and thrust bearing U.

The parts may be easily adjusted to position and removed for inspection or repairs. The end plate B¹ may be removed carrying the bearings P and U and the sleeves H and Q with it. The gear wheel J may be removed by simply sliding it along and over the end of the extension of the shaft C. These parts may be placed in position by simply sliding the gearing J over the extension of the shaft C, its toothed end automatically engaging the end of the sleeve L. The sleeves H and Q simply slide in position over their respective shafts. When the end plate B¹ is bolted to the case B, the parts are firmly secured in position. Obviously if the openings for the bearings P and U are made large enough one of said bearings with its sleeve and attached parts may be removed without the other.

What I claim is:—

1. In combination with the main shaft and cam shaft of a gas engine, a gear connection between said shafts whereby the cam shaft is driven at half the speed of the main shaft, and a driven shaft, of a change speed gearing between the main shaft and driven shafts, said change speed gearing including a gear wheel loosely mounted upon the cam shaft, a gear connection between said gear and the main shaft for driving said gear at the same angular velocity as that of the cam shaft, and gear connections between the gear on the cam shaft and the said driven shaft for transmitting motion from the said gear to the said driven shaft.

2. In combination with the main shaft and cam shaft of a gas engine, a gear connection between said shafts whereby the cam shaft is driven at half the speed of the main shaft, and a driven shaft, of a change speed gearing between the main shaft and driven shaft, said change speed gearing including a sleeve loosely mounted upon the cam shaft, a gear connection between said sleeve and the main shaft for driving the sleeve at the same angular velocity as that of the cam shaft, and gear wheels on the sleeve and driven shaft for transmitting motion from the sleeve to said driven shaft.

3. In combination with the main shaft and cam shaft of a gas engine, a gear connection between said shafts whereby the cam shaft is driven at half the speed of the main shaft, and a driven shaft, of a change speed gearing between the main shaft and the driven shaft, said change speed gearing including a sleeve loosely mounted upon the cam shaft, a gear connection between said sleeve and the main shaft for driving the sleeve at the same angular velocity as that of the cam shaft, said gear connection comprising a gear wheel fixed to said sleeve, a gear wheel loosely mounted upon the main shaft and meshing with the first mentioned gear wheel, means for coupling the gear wheel on the main shaft to said shaft to rotate therewith, and for uncoupling the same from the shaft, and gear wheels on the sleeve and driven shaft for transmitting motion from the sleeve to said driven shaft.

4. In combination with the main shaft and cam shaft of a gas engine, a gear connection between said shafts whereby the cam shaft is driven at half the speed of the main shaft, and a driven shaft, of a change speed gearing between the main shaft and the driven shaft, said change speed gearing including a sleeve loosely mounted upon the cam shaft, a gear connection between said sleeve and the main shaft for driving the sleeve at the same angular velocity as that of the cam shaft, said gear connection comprising a gear wheel fixed to said sleeve, a gear wheel loosely mounted upon the main shaft and meshing with the first mentioned gear wheel, means for coupling the gear wheel on the main shaft to said shaft for rotation therewith and for uncoupling the same from the shaft, a second gear wheel fixed on the sleeve, a gear wheel slidably mounted upon the driven shaft to rotate therewith, means on said slidable gear and the gear wheel on the main shaft to couple the same together, said slidable gear being adapted to be positioned to mesh with the said second gear on the sleeve, or to be positioned to couple the same with the gear wheel on the main shaft, substantially as described.

In testimony whereof, I sign this specification in the presence of two witnesses.

BOUDEWIJN B. NEUTEBOOM.

Witnesses:
 VIRGINIA C. SPRATT,
 ELLIOTT J. STODDARD.

Copies of this patent may be obtained for five cents each, by addressing the "Commissioner of Patents, Washington, D. C."